(12) United States Patent
Nakamura

(10) Patent No.: US 11,706,515 B2
(45) Date of Patent: Jul. 18, 2023

(54) IMAGING DEVICE

(71) Applicant: NIDEC COPAL CORPORATION, Tokyo (JP)

(72) Inventor: Yuta Nakamura, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 17/724,491

(22) Filed: Apr. 20, 2022

(65) Prior Publication Data
US 2022/0345601 A1    Oct. 27, 2022

(30) Foreign Application Priority Data

Apr. 21, 2021  (JP) .................................. 2021-071525

(51) Int. Cl.
*H04N 23/56* (2023.01)
*G03B 15/02* (2021.01)
*H04N 23/51* (2023.01)
*H04N 23/55* (2023.01)

(52) U.S. Cl.
CPC ............ *H04N 23/56* (2023.01); *G03B 15/02* (2013.01); *H04N 23/51* (2023.01); *H04N 23/55* (2023.01)

(58) Field of Classification Search
CPC ........ H04N 23/56; H04N 23/51; H04N 23/55; H04N 23/00; H04N 23/50; G03B 15/02; G03B 17/02; G03B 30/00; G03B 15/05; F21V 23/00
See application file for complete search history.

(56) References Cited

U.S. PATENT DOCUMENTS

| 10,288,985 | B2 * | 5/2019 | Nakamura | ............ G02B 7/025 |
| 10,564,522 | B2 * | 2/2020 | Hirota | ....................... B60R 1/00 |
| 2003/0089776 | A1 * | 5/2003 | Hennick | ............ G06K 7/10861 235/454 |
| 2017/0094174 | A1 * | 3/2017 | Asakawa | ............ H04N 23/689 |
| 2019/0158710 | A1 | 5/2019 | Hirota | |
| 2019/0289175 | A1 * | 9/2019 | Hirota | ................... B60W 40/08 |

FOREIGN PATENT DOCUMENTS

JP    201995541 A    6/2019

* cited by examiner

*Primary Examiner* — Bao Q Truong
(74) *Attorney, Agent, or Firm* — Hauptman Ham, LLP

(57) ABSTRACT

An imaging device with a compact design allows illumination with a light source and imaging with an image sensor. An imaging device includes a front case having a front surface including a window and a lens-holder receptacle aligned with each other in a width direction (X-direction), a lens holder including a lens and attachable inside the lens-holder receptacle in the front case, a first circuit board on which an image sensor to receive light through the lens in the lens holder is mounted, and a second circuit board on which an LED to emit light through the window in the front case is mounted. The first and second circuit boards extend entirely in the width direction. The second circuit board is located frontward from the first circuit board.

5 Claims, 6 Drawing Sheets

IMAGING DEVICE

RELATED APPLICATIONS

The present application claims priority to Japanese Application Number 2021-071525, filed Apr. 21, 2021, the disclosure of which is hereby incorporated by reference herein in its entirety.

BACKGROUND

Technical Field

The present invention relates to an imaging device, and more particularly, to an imaging device including a light source and an image sensor.

Description of the Background

To prevent accidents involving automobiles or other vehicles, driver monitoring systems (DMSs) have recently been developed to monitor the state of the driver (e.g., any sign of lowered attention or drowsiness). A known DMS includes an imaging device that captures images of the driver while illuminating the driver with light such as near-infrared light (refer to, for example, Patent Literature 1). Such an imaging device is often embedded in the dashboard, the instrument panel, or another decorative part of an automobile, and thus is to be compact and to avoid affecting the design of the vehicle interior.

CITATION LIST

Patent Literature

Patent Literature 1: Japanese Unexamined Patent Application Publication No. 2019-95541

BRIEF SUMMARY

One or more aspects of the present invention are directed to an imaging device with a compact design that allows illumination with a light source and imaging with an image sensor.

An imaging device according to an aspect of the present invention has a compact design and can perform illumination with a light source and imaging with an image sensor. The imaging device includes an enclosure, a lens holder including at least one lens, a first circuit board on which an image sensor is mounted, and a second circuit board on which at least one light source is mounted. The enclosure has a front surface including at least one window and a lens-holder receptacle. The at least one window and the lens-holder receptacle are aligned with one another in a width direction of the enclosure. The lens holder is attachable inside the lens-holder receptacle in the enclosure. The first circuit board extends entirely in the width direction. The image sensor receives light through the least one lens in the lens holder. The second circuit board extends entirely in the width direction. The at least one light source emits light through the at least one window in the enclosure. The second circuit board is located frontward from the first circuit board.

DETAILED DESCRIPTION

Figure 1:
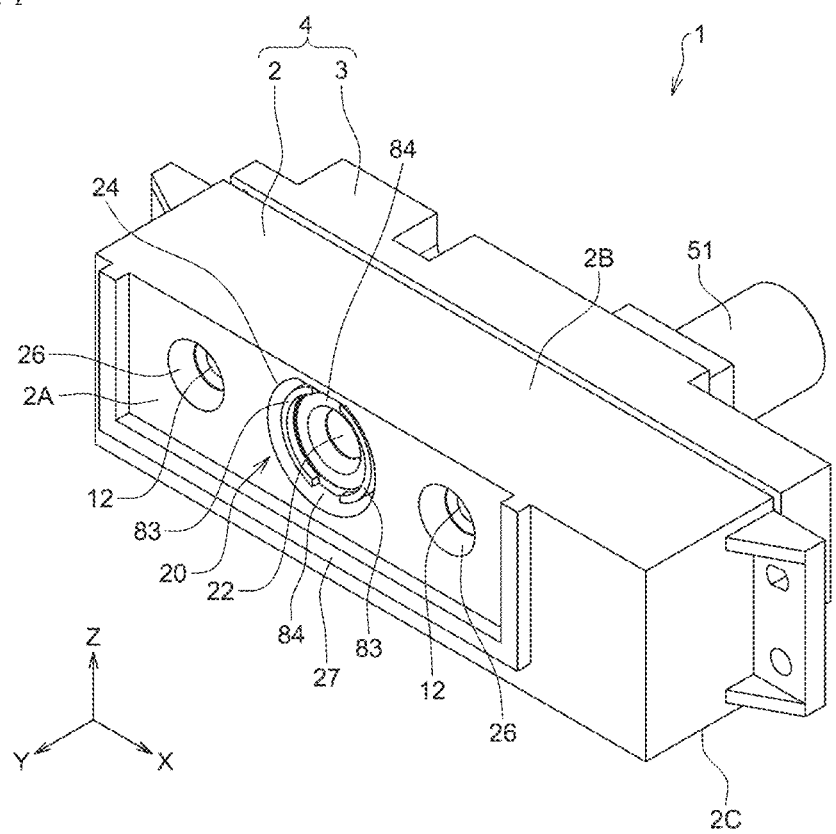
FIG. 1 is a perspective view of an imaging device according to one embodiment of the present invention.

An imaging device according to one or more embodiments of the present invention will now be described in detail with reference to FIGS. 1 to 7. In FIGS. 1 to 7, the same or corresponding components are given the same reference numerals, and will not be described repeatedly. In FIGS. 1 to 7, the scale and dimensions of each component may be exaggerated, or one or more components may not be shown. Unless otherwise specified, the terms such as first and second will be used herein simply to distinguish the components and will not represent a specific order or sequence.

FIG. 1 is a perspective view of an imaging device 1 according to an embodiment of the present invention. The imaging device 1 according to the present embodiment below may be used in a driver monitoring system (DMS) with the structure described above, but may also be used in other applications.

As shown in FIG. 1, the imaging device 1 includes an enclosure 4 including a front case 2 and a rear case 3, two light-emitting diodes (LEDs) 12 accommodated in the enclosure 4 as light sources for emitting near-infrared light, and a lens holder 20 for internally holding at least one lens 22. To simplify the drawing, a sealing sheet and a cover (described below) are not shown in FIG. 1. For ease of explanation in the present embodiment, the term front or frontward refers to the positive Y-direction in FIG. 1, and the term rear or rearward refers to the negative Y-direction in FIG. 1.

Figure 2:
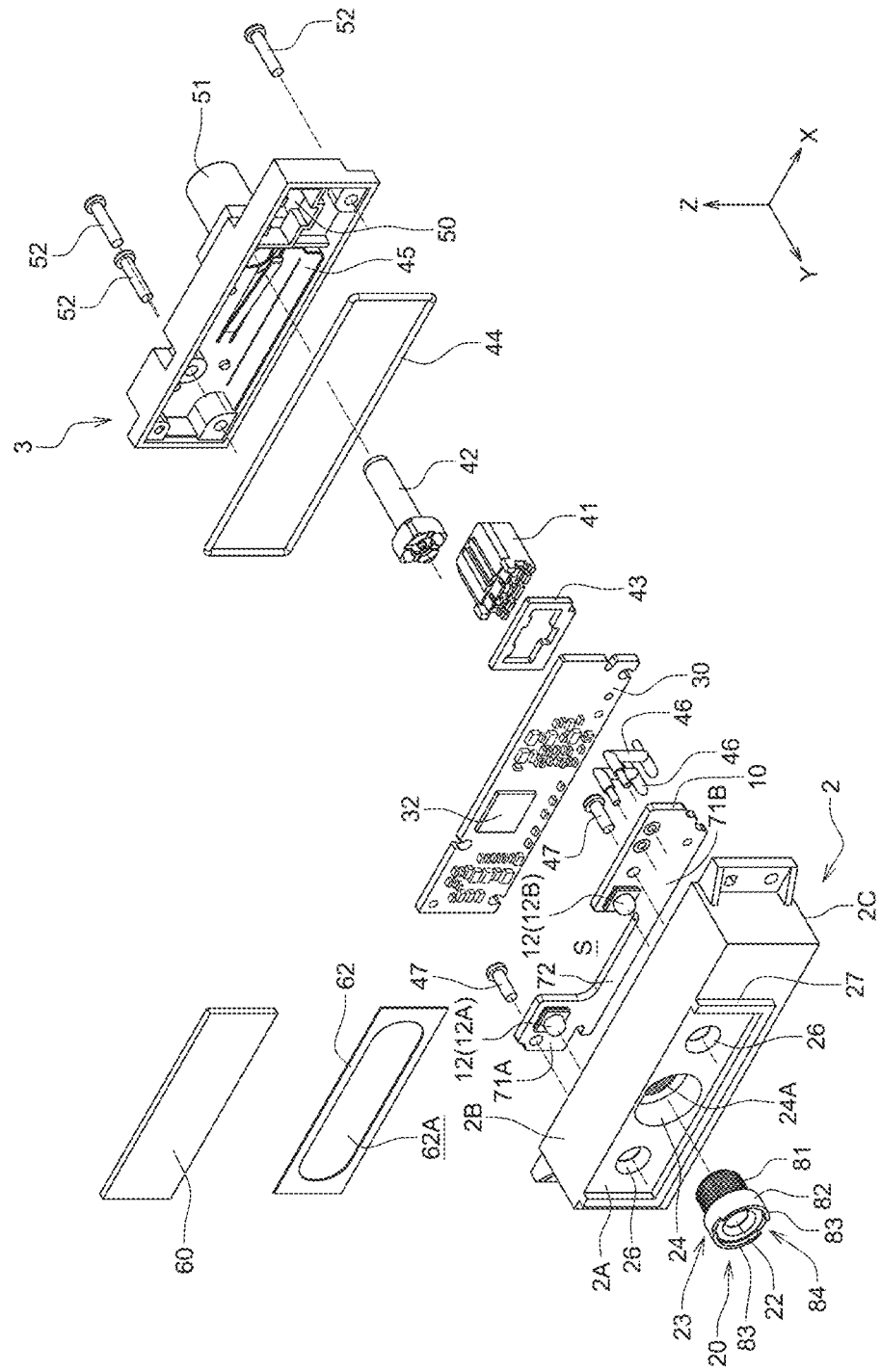
FIG. 2 is an exploded perspective view of the imaging device shown in FIG. 1.
Figure 3:
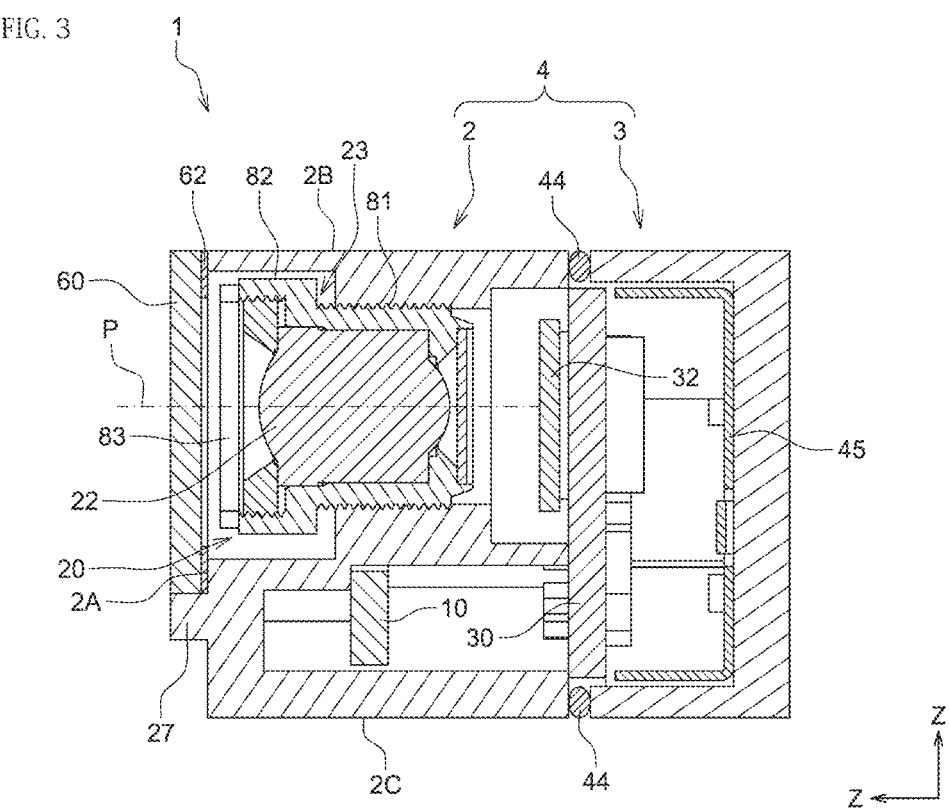
FIG. 3 is a longitudinal sectional view of the imaging device shown in FIG. 1.
Figure 4:
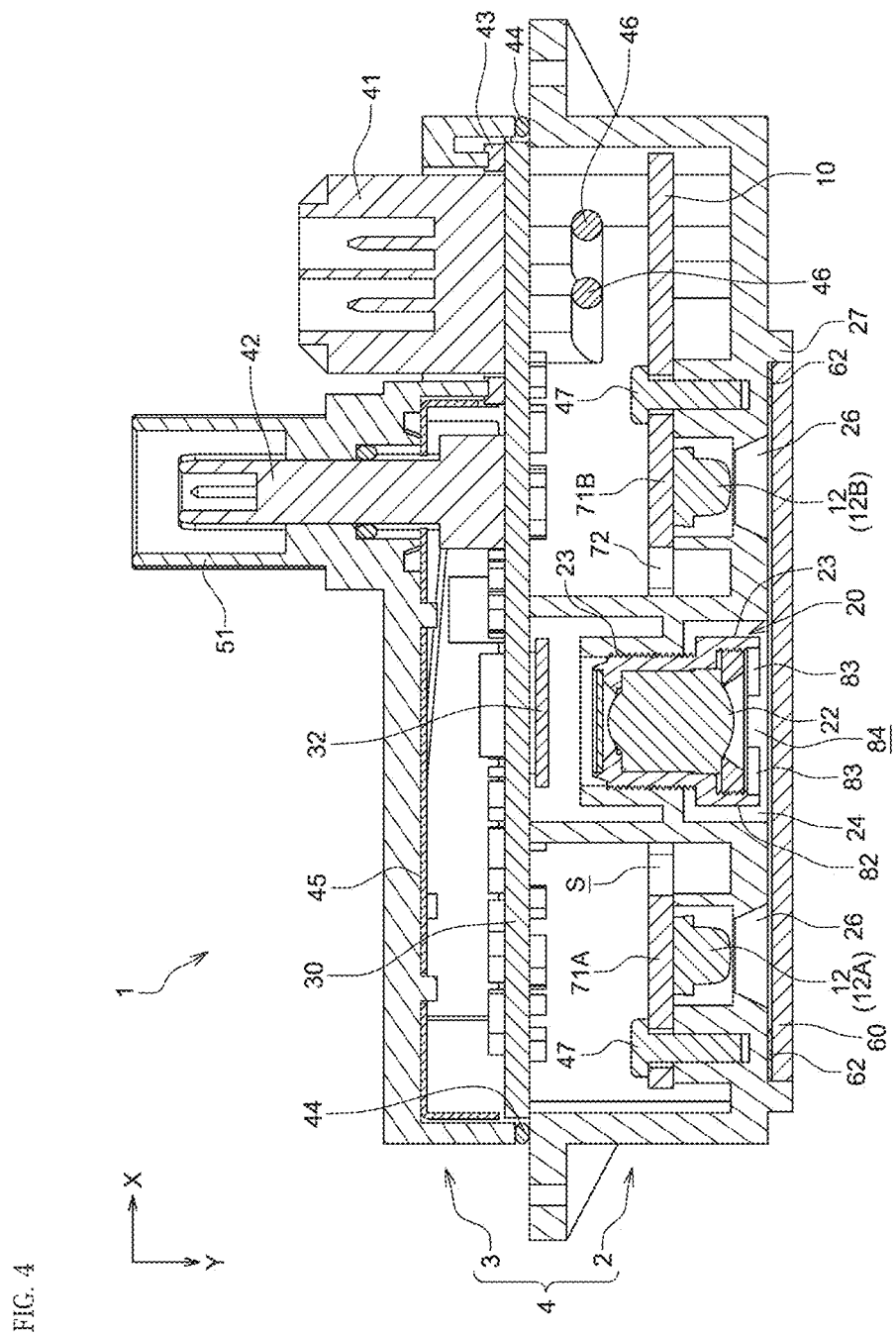
FIG. 4 is a cross-sectional view of the imaging device shown in FIG. 1.

FIG. 2 is an exploded perspective view of the imaging device 1, FIG. 3 is a longitudinal sectional view, and FIG. 4 is a cross-sectional view. As shown in FIGS. 2 to 4, the imaging device 1 includes, between the front case 2 and the rear case 3, a first circuit board 30 on which an image sensor 32 is mounted, a second circuit board 10 on which the LEDs 12 are mounted, and an LED connector 41 and a camera connector 42 that are attached to the first circuit board 30. The LED connector 41 is surrounded by a waterproof and dustproof seal 43. The rear case 3 is fastened to the front case 2 with screws 52, with a seal 44 between the front case 2 and the rear case 3 extending along their outer edges. The rear case 3 contains a shield 45 to reduce signal noise.

The rear case 3 has a connector opening 50, in which the LED connector 41 is received. As shown in FIG. 4, the LED connector 41 has a rear end protruding from the rear case 3 and exposed outside. The LED connector 41 can receive, from behind the rear case 3, a mating connector (not shown), through which control signals are input into the LEDs 12.

The rear case 3 includes a cylindrical portion 51 extending rearward (negative Y-direction). The cylindrical portion 51 receives and accommodates the camera connector 42.

The camera connector 42 can receive, from behind the rear case 3, a mating connector (not shown), through which signals obtained by the image sensor 32 are output outside.

As shown in FIGS. 2 to 4, the first circuit board 30 and the second circuit board 10 each extend entirely in X-direction (width direction). The second circuit board 10 is located frontward from the first circuit board 30 (positive Y-direction). The two LEDs 12 mounted on the second circuit board 10 are connected with wires 46 to the LED connector 41 mounted on the first circuit board 30. The second circuit board 10 is fastened to the front case 2 with screws 47.

As shown in FIG. 2, the front case 2 has a front surface 2A having a lens-holder receptacle 24 in substantially the middle in the width direction. The lens-holder receptacle 24 accommodates the lens holder 20. The front surface 2A also has windows (openings) 26 on both sides of the lens-holder receptacle 24 in the width direction. The lens-holder receptacle 24 has an internal thread 24A inside. In the present embodiment, the front surface 2A of the front case 2 has the lens-holder receptacle 24 and the windows 26 that are aligned with one another in the width direction.

Figure 5A:
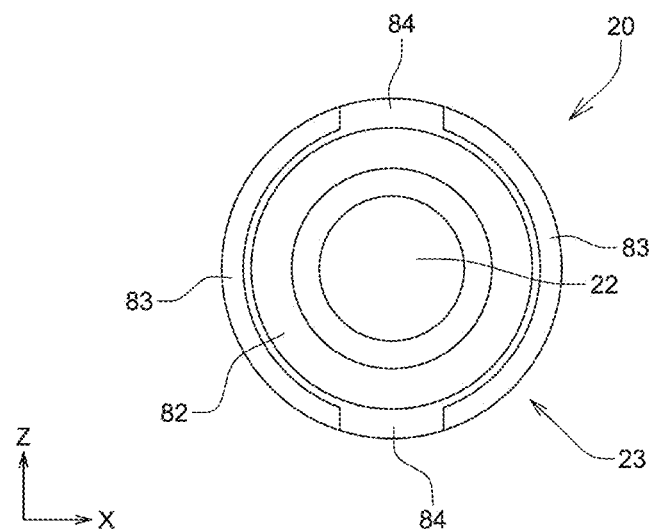
FIG. 5A is a front view of a lens holder in the imaging device shown in FIG. 2.
Figure 5B:
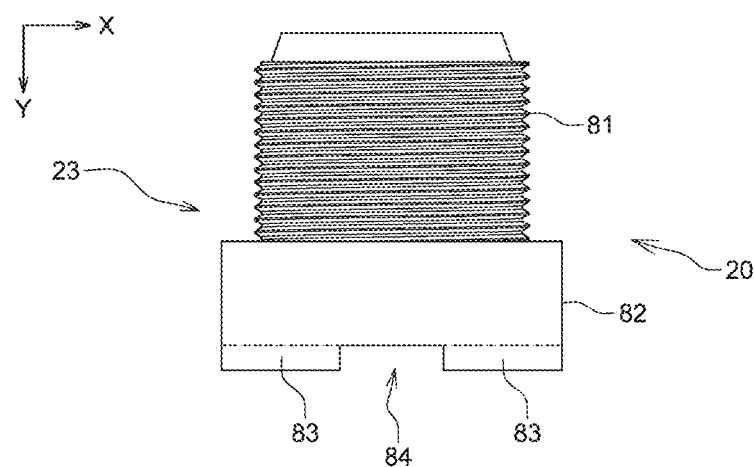
FIG. 5B is a plan view of the lens holder shown in FIG. 5A.

FIG. 5A is a front view of the lens holder 20. FIG. 5B is a plan view of the lens holder 20. As shown in FIGS. 5A and 5B, the lens holder 20 includes one or more lenses 22 and a lens barrel 23 for holding the lenses 22. In the cross-sectional views in FIGS. 3 and 4, such multiple lenses are schematically shown as a single lens 22 to simplify the drawings.

The lens barrel 23 includes an external thread 81 that screws with the internal thread 24A on the lens-holder receptacle 24 in the front case 2, and a flange 82 located frontward from the external thread 81. The flange 82 has a larger diameter than the external thread 81. With the external thread 81 on the lens holder 20 screwed with the internal thread 24A on the lens-holder receptacle 24 in the front case 2, the lens holder 20 is attached inside the lens-holder receptacle 24 in the front case 2.

The lens barrel 23 includes two extensions 83 extending frontward from the outer rim of the front edge of the flange 82. The two extensions 83 are spaced circumferentially apart from each other, defining grooves 84 between the extensions 83. In the present embodiment, the two extensions 83 are arranged symmetrical to each other with respect to the YZ plane, with the two grooves 84 at the positions rotated by 180 degrees about the optical axis of the lens 22.

A fixture (not shown) such as a flathead screwdriver can be inserted into the grooves 84 between the extensions 83. The lens barrel 23 is rotated with the fixture inserted in the grooves 84. The lens holder 20 can thus be moved in Y-direction (optical axis direction) as the external thread 81 on the lens barrel 23 is screwed with the internal thread 24A on the lens-holder receptacle 24. In this manner, the lens holder 20 is moved in Y-direction to adjust the focus of an image to be obtained by the image sensor 32.

The LEDs 12 mounted on the second circuit board 10 are located behind the windows 26 in the front case 2. This structure allows emission of light (illumination light) from the LEDs 12 to travel through the windows 26 in the front case 2 and illuminates an object to be imaged (e.g., the driver). In the present embodiment, the image sensor 32 can capture images while illumination is being performed with light from the LEDs 12, thus allowing the image sensor 32 to obtain higher-quality images.

Referring back to FIG. 1, the front case 2 includes a ridge 27 rising frontward (positive Y-direction) from the front surface 2A. The ridge 27 extends in a substantially rectangular loop with one missing side. The ridge 27 extends below and lateral to the lens-holder receptacle 24 and the windows 26. The area having three sides defined by the ridge 27 receives a sealing sheet 62 and a cover 60 shown in FIG. 2.

The cover 60 covers the front of the lens-holder receptacle 24 and the front of each window 26 in the front case 2. The cover 60 is formed from a material that transmits light emitted from the LEDs 12. In the present embodiment, the LEDs 12 emit near-infrared light that is used by the image sensor 32 to obtain near-infrared light images. The cover 60 may thus include a filter that blocks visible light to reduce visible light that can affect images obtained by the image sensor 32.

The sealing sheet 62 is formed from a waterproof and dustproof material. The front case 2 has an opening 62A corresponding to the lens-holder receptacle 24 and the windows 26. In other words, the sealing sheet 62 surrounds the lens-holder receptacle 24 and the windows 26 in the front case 2. The sealing sheet 62 surrounding the lens-holder receptacle 24 and the windows 26 in the front case 2 and the cover 60 on the front surface of the sealing sheet 62 reduce entry of external water or dust into the lens holder 20 in the lens-holder receptacle 24 and the LEDs 12 located behind the windows 26.

The sealing sheet 62 may be double-sided tape. With the sealing sheet 62 being double-sided tape, the cover 60 can be attached to the front surface 2A of the front case 2.

In the present embodiment, the ridge 27 rising frontward from the front surface 2A of the front case 2 extends below and lateral to the lens-holder receptacle 24 and the windows 26. The sealing sheet 62 and the cover 60 can be placed along the ridge 27 for positioning the sealing sheet 62 and the cover 60 that are placed on the front surface 2A of the front case 2.

As shown in FIGS. 3 and 4, the image sensor 32 is located on the surface on which an image is formed with light traveling through the lens 22 in the lens holder 20. The image sensor 32 receives light traveling through the lens 22. As shown in FIG. 3, the lens holder 20 has the central axis (optical axis) P above the middle between an upper surface 2B and a lower surface 2C of the front case 2. More specifically, the central axis P of the lens holder 20 is closer to the upper surface 2B of the front case 2 than to the lower surface 2C. For the imaging device 1 to be embedded in a decorative part such as the dashboard or the instrument panel in an automobile, components other than the lens holder 20 can be embedded in the decorative part. The lens holder 20 is placed upward in the front case 2 in this manner to allow the imaging device 1 to protrude less from the decorative part. The imaging device 1 is thus less likely to affect the design of the vehicle interior.

Figure 6:
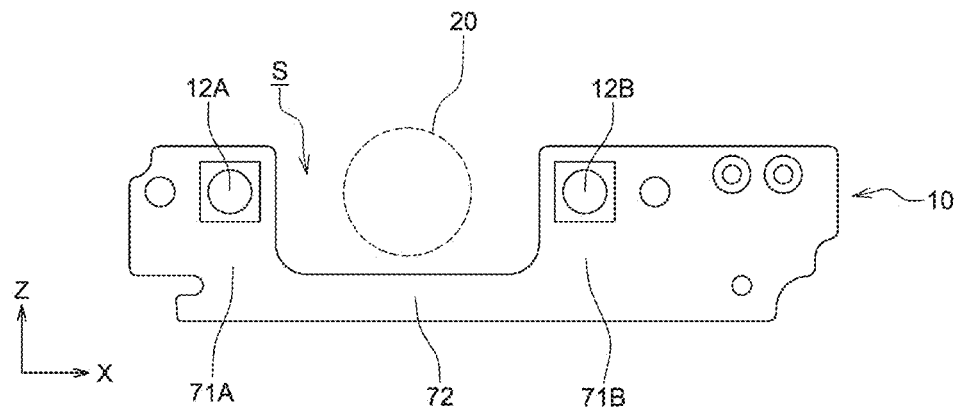
FIG. 6 is a front view of a second circuit board included in the imaging device shown in FIG. 2.
Figure 7:
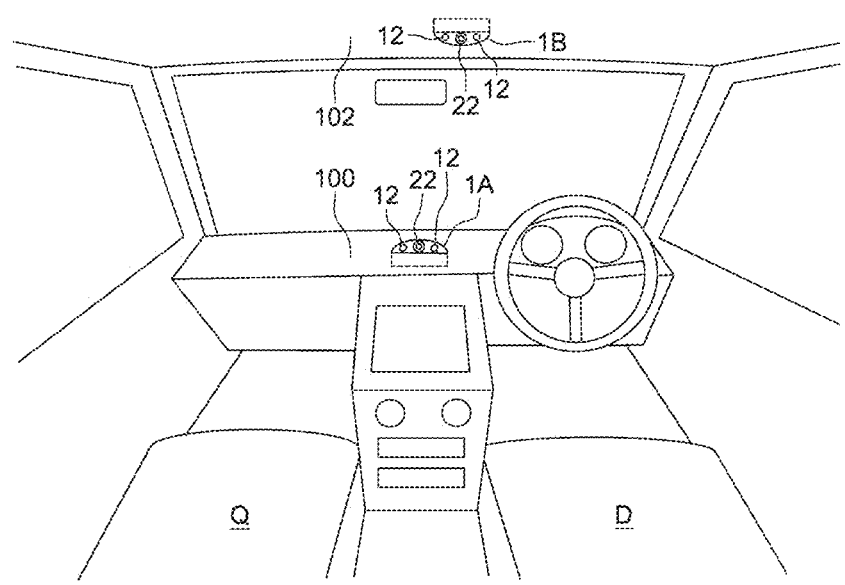
FIG. 7 is a schematic diagram of the imaging device shown in FIG. 1 installed in the interior of an automobile.

FIG. 6 is a front view of the second circuit board 10. In the present embodiment, as shown in FIG. 6, the two LEDs 12 (12A, 12B) are mounted on the single second circuit board 10. The multiple LEDs 12 mounted on the single circuit board can be connected commonly using the same wiring. This structure thus uses less wiring inside the circuit board and can reduce the size of the circuit board. The first circuit board 30 on which the LED connector 41 is mounted can be connected to the two LEDs 12 simply using two wires 46, or specifically, a positive wire and a negative wire. The multiple LEDs 12A and 12B as used in the present embodiment allow the imaging device 1 to emit more light (illumination light), thus allowing the image sensor 32 to obtain higher-quality images.

As shown in FIG. 6, the second circuit board 10, which is in a substantially U shape, includes a light-source mount 71A on which the LED 12A is mounted, a light-source mount 71B on which the LED 12B is mounted, and a connector portion 72 connecting the two light-source mounts 71A and 71B to each other. The connector portion 72 has a dimension less than the dimensions of the light-source mounts 71A and 71B in the height direction (Z-direction), and extends in the width direction below the lens holder 20. This defines, above the connector portion 72, a lens holder space S to receive the lens holder 20. The connector portion 72 thus connects the light-source mounts 71A and 71B to each other without interfering with the lens holder 20.

As described above, the connector portion 72 of the second circuit board 10 connects the light-source mounts 71A and 71B without interfering with the lens holder 20. This structure allows mounting of the multiple LEDs 12A and 12B without increasing the dimension of the second circuit board 10 in the height direction (Z-direction). This structure reduces the size of the second circuit board 10, and thus reduces the size of the imaging device 1 while allowing the imaging device 1 to emit more light (illumination light).

The image sensor 32 and the LEDs 12 when both mounted on a single circuit board can increase the dimensions of the circuit board in the width and height directions. In the present embodiment, as shown in FIGS. 2 to 4, the first circuit board 30 on which the image sensor 32 is mounted and the second circuit board 10 on which the LEDs 12 are mounted are separate from each other. The second circuit board 10 is located frontward from the first circuit board 30. This structure can avoid an excessive increase in the dimensions of the first and second circuit boards 10 and 30 in the width and height directions.

The second circuit board 10 on which the LEDs 12 are mounted when placed at the rear can increase the distance from the LEDs 12 to the windows 26 in the front case 2. In this case, the dimensions of the windows 26 in the width and height directions are to be increased to reduce light diffusion. In the present embodiment, the second circuit board 10 on which the LEDs 12 are mounted is placed frontward from the first circuit board 30. This structure can avoid an excessive increase in the dimensions of the windows 26 in the front case 2 in the width and height directions. The entire imaging device 1 can thus be compact.

In the above embodiment, the two LEDs 12 are mounted on the second circuit board 10. In some embodiments, one LED 12 or three or more LEDs 12 may be mounted on the second circuit board 10. Two or more LEDs 12 mountable on the second circuit board 10 may be placed on both sides of the lens holder 20 in the width direction.

The directional terms such as above, below, upward, downward, upper, lower, front, frontward, rear, rearward, the width direction, and the height direction herein simply refer to relative positional relationships between components in the embodiment described above, and do not refer to any absolute positional relationships. These terms may refer to different directions for the imaging device 1 placed at positions or in orientations other than described herein. For example, the imaging device 1 may be embedded in a dashboard 100 between the driver's seat D and a passenger seat Q of an automobile, similarly to an imaging device 1A in FIG. 7, for which the terms above and upward refer to vertically upward, and the terms below and downward refer to vertically downward. For example, the imaging device 1 may be embedded in a ceiling 102 of an automobile, similarly to an imaging device 1B in FIG. 7, for which the terms above and upward refer to vertically downward, and the terms below and downward refer to vertically upward. The imaging device 1 emits, for example, infrared rays from the LEDs 12 toward the driver's seat D, and captures an image of the driver with the image sensor 32 through the lens 22 for analyzing the state of the driver.

As described above, the imaging device according to an aspect of the present invention has a compact design and can perform illumination with the light source and imaging with the image sensor. The imaging device includes an enclosure, a lens holder including at least one lens, a first circuit board on which an image sensor is mounted, and a second circuit board on which at least one light source is mounted. The enclosure has a front surface including at least one window and a lens-holder receptacle. The at least one window and the lens-holder receptacle are aligned with one another in a width direction of the enclosure. The lens holder is attachable inside the lens-holder receptacle in the enclosure. The first circuit board extends entirely in the width direction. The image sensor receives light through the least one lens in the lens holder. The second circuit board extends entirely in the width direction. The at least one light source emits light through the at least one window in the enclosure. The second circuit board is located frontward from the first circuit board.

The image sensor and the light source when both mounted on a single circuit board can increase the dimensions of the circuit board in the width and height directions. In the aspect of the present invention, the circuit board with the image sensor and the circuit board with the light source are separate from each other, and the circuit board with the light source is placed frontward from the circuit board with the image sensor. This structure can avoid an unintended increase in the dimensions of these circuit boards in the width and height directions. The second circuit board with the light source when placed at the rear can increase the distance from the light source to the window in the enclosure. In this case, the dimensions of the window in the width and height directions are to be increased to reduce light diffusion. In the aspect of the present invention, the second circuit board with the light source is placed frontward from the first circuit board. This structure can avoid an increase in the dimensions of the window in the width and height directions. The entire imaging device can thus be compact.

The lens holder may have a central axis closer to an upper surface of the enclosure than to a lower surface of the enclosure. For an imaging device embedded in a decorative part such as the dashboard or the instrument panel in an automobile, for example, components other than the lens holder can be embedded in the decorative part. The lens holder can be placed upward in the enclosure to allow the imaging device to protrude less from the decorative part. The imaging device is less likely to affect the design of the vehicle interior.

The at least one light source may include a first light source adjacent to a first side of the lens holder in the width direction, and a second light source adjacent to a second side of the lens holder in the width direction. The multiple light sources mounted on the second circuit board can be connected commonly using the same wiring. This structure thus uses less wiring inside the second circuit board and can reduce the size of the second circuit board. The multiple light sources as used herein allow the imaging device to emit more light (illumination light), thus allowing the image sensor to obtain higher-quality images.

The second circuit board may include a first light-source mount on which the first light source is mounted, a second light-source mount on which the second light source is mounted, and a connector portion connecting the first light-source mount and the second light-source mount below the lens holder to avoid interfering with the lens holder. This structure allows mounting of multiple light sources without increasing the height dimension of the second circuit board. This structure reduces the size of the second circuit board and thus reduces the size of the imaging device, while allowing the imaging device to emit more light (illumination light).

The imaging device may further include a sealing sheet located on the front surface of the enclosure and surrounding the lens-holder receptacle, and a cover attachable on a front surface of the sealing sheet. The sealing sheet surrounding the lens-holder receptacle and the cover on the front surface of the sealing sheet reduce entry of external water or dust into the lens holder in the lens-holder receptacle.

Although the embodiments of the present invention have been described above, the present invention is not limited to the above embodiments and may be modified variously within the scope of its technical idea.

What is claimed is:

1. An imaging device, comprising:
    an enclosure having a front surface including at least one window and a lens-holder receptacle, the at least one window and the lens-holder receptacle being aligned with one another in a width direction of the enclosure;
    a lens holder including at least one lens, the lens holder being attachable inside the lens-holder receptacle in the enclosure;
    a first circuit board on which an image sensor is mounted, the first circuit board extending entirely in the width direction, the image sensor being configured to receive light through the least one lens in the lens holder; and
    a second circuit board on which at least one light source is mounted, the second circuit board extending entirely in the width direction, the second circuit board being located frontward from the first circuit board, the at least one light source being configured to emit light through the at least one window in the enclosure.

2. The imaging device according to claim 1, wherein the lens holder has a central axis closer to an upper surface of the enclosure than to a lower surface of the enclosure.

3. The imaging device according to claim 1, wherein the at least one light source includes
    a first light source adjacent to a first side of the lens holder in the width direction, and
    a second light source adjacent to a second side of the lens holder in the width direction.

4. The imaging device according to claim 3, wherein the second circuit board includes
    a first light-source mount on which the first light source is mounted,
    a second light-source mount on which the second light source is mounted, and
    a connector portion connecting the first light-source mount and the second light-source mount below the lens holder to avoid interfering with the lens holder.

5. The imaging device according to claim 1, further comprising:
    a sealing sheet on the front surface of the enclosure, the sealing sheet surrounding the lens-holder receptacle; and
    a cover attachable on a front surface of the sealing sheet.

* * * * *